(12) United States Patent
Masutani

(10) Patent No.: US 7,036,878 B2
(45) Date of Patent: May 2, 2006

(54) VEHICLE SEAT WITH INTEGRAL SEAT BELT MECHANISM

(75) Inventor: Eiji Masutani, Tochigi-ken (JP)

(73) Assignee: TS Tech Co., Ltd., Saitama-ken (JP)

( * ) Notice: Subject to any disclaimer, the term of this patent is extended or adjusted under 35 U.S.C. 154(b) by 0 days.

(21) Appl. No.: 10/857,611

(22) Filed: Jun. 1, 2004

(65) Prior Publication Data

US 2005/0134099 A1    Jun. 23, 2005

(30) Foreign Application Priority Data

May 30, 2003    (JP)    ............................ 2003-153811

(51) Int. Cl.
*B60N 2/42*    (2006.01)
(52) U.S. Cl. .................... 297/216.1; 297/468
(58) Field of Classification Search ............. 297/216.1, 297/344.15, 344.17, 468; 248/393–396, 248/398, 421, 424, 429, 430
See application file for complete search history.

(56) References Cited

U.S. PATENT DOCUMENTS

| | | | | |
|---|---|---|---|---|
| 4,229,041 A | * | 10/1980 | Werner | 297/468 |
| 4,262,963 A | * | 4/1981 | Bauer et al. | 297/473 |
| 4,487,390 A | * | 12/1984 | Miyashita | 248/396 |
| 4,790,597 A | * | 12/1988 | Bauer et al. | 297/468 |
| 5,213,300 A | * | 5/1993 | Rees | 248/429 |
| 5,282,672 A | * | 2/1994 | Borlinghaus | 297/468 |
| 5,785,387 A | * | 7/1998 | Hernandez et al. | 297/473 |
| 6,116,689 A | * | 9/2000 | Bauer et al. | 297/344.15 |
| 6,309,021 B1 | * | 10/2001 | Yasui et al. | 297/344.1 |
| 6,467,849 B1 | * | 10/2002 | Deptolla | 297/464 |
| 6,572,065 B1 | * | 6/2003 | Koga et al. | 248/421 |
| 6,902,234 B1 | * | 6/2005 | Becker et al. | 297/216.1 |

* cited by examiner

*Primary Examiner*—Peter R. Brown
(74) *Attorney, Agent, or Firm*—Browdy and Neimark, PLLC

(57) ABSTRACT

A vehicle seat has a seat bottom frame, a seat back frame rotatably attached to the seat bottom frame, a lower rail fixed to a vehicle body, an upper rail slidably attached to the lower rail, and a height control mechanism and a height lock mechanism provided between the upper rail and the seat bottom frame. A belt retractor of a seat belt mechanism is fixed to the bottom frame or the back frame. A tip anchor and a tongue anchor of the seat belt mechanism are coupled to the upper rail.

5 Claims, 4 Drawing Sheets

VEHICLE SEAT WITH INTEGRAL SEAT BELT MECHANISM

BACKGROUND OF THE INVENTION

1. Field of the Invention

The present invention relates to a vehicle seat with an integral seat belt mechanism.

2. Description of the Related Art

FIG. 8 shows a conventional vehicle seat A and a conventional individual seat belt mechanism B. The seat belt mechanism B has a seat belt C, a retractor D disposed in a vehicle door pillar, a tip anchor E engaged with a tip end of the seat belt C, a tongue plate F attached at the midpoint of the seat belt C and a tongue anchor G with which the tongue plate F is detachably engaged.

In the individual seat belt mechanism, the retractor D, the tip anchor E and the tongue anchor G are fixed or connected to a vehicle body. Accordingly, when the seat belt C supports the driver or passenger against shock caused by an accident and the like, impact load acting on the seat belt C is directly transmitted to the vehicle body. In other words, the impact load acting on the seat belt C is not transmitted to the vehicle seat A.

The above seat belt mechanism is very excellent in supporting the driver or passenger. However, vehicle manufacturing line requires the operation of assembling the vehicle seat and the seat belt mechanism individually to the vehicle body. Moreover, the seat belt mechanism has a disadvantage in comfort. Even if the position of the vehicle seat A is adjusted, the position of the seat belt mechanism B is not adjusted.

JP 2002-59770A discloses a vehicle seat with an integral seat belt mechanism. The integral seat belt mechanism has a retractor (43) fixed to a seat back frame (20), a tip anchor (41) that is fixed to a seat bottom frame (11) and coupled to a tip end of a seat belt and a tongue anchor (44) that is fixed to the seat bottom frame (11) and detachably engaged with a tongue plate (42).

In the integral seat belt mechanism, even if the position of the vehicle seat is adjusted backward or forward, the relative position of the seat belt with respect to the vehicle seat is not changed. For this reason, the integral seat belt mechanism offers an excellent comfort. Further, since the integral seat belt mechanism is previously attached to the vehicle seat, the number of processes in the vehicle manufacturing line can be reduced. However, impact load acting on the integral seat belt mechanism is entirely transmitted to the vehicle seat. Accordingly, when the seat belt mechanism is attached to the vehicle seat, the strength of the framework of the vehicle seat needs to be improved.

For example, JP 2002-59770A discloses reinforcing plates (21), (22) for preventing the seat back frame (20) from deforming due to load applied through the seat belt. JP 11-278127A discloses a damper (14) for preventing a seat back frame (3) from falling frontward due to impact load. However, the above-mentioned conventional arts do not comprise a height control mechanism of the vehicle seat.

US 2001/0005003A1 discloses a tip anchor (72) attached to a height adjustable seat bottom frame (11) with a shaft (75). Further, FR 2796602A discloses a tongue anchor (32) attached to a height adjustable seat bottom frame (11) with a shaft (246). Although these two prior arts has a mechanism for adjusting the height of the vehicle sheet, only the tip anchor or the tongue anchor of the seat belt mechanism is attached to the vehicle seat. The reason will be described below.

When the tip anchor or the tongue anchor is attached to the height adjustable seat bottom frame, impact load applied to the seat belt acts on the seat bottom frame as a force of moving the seat bottom frame upwards. The conventional and typical height control mechanism has a high resistance to down force, but has a low resistance to upper force. For this reason, the above-mentioned two prior arts have a height lock mechanism for preventing the seat bottom frame from moving upward due to the impact load.

When only the tip anchor or the tongue anchor is attached to the vehicle seat, only a part of the impact load applied to the seat belt is transmitted to the vehicle seat and remaining impact load is dispersed over the vehicle body. Consequently, the height lock mechanism can be manufactured so as to have a practical size. However, since all impact load is transmitted to the vehicle seat in the integrated seat belt mechanism, the height lock mechanism becomes heavy. Such heavy height lock mechanism cannot satisfy automobile manufacturers.

SUMMARY OF THE INVENTION

An object of the invention is to provide a vehicle seat with an seat belt mechanism in which upper force transmitted to a seat bottom frame via a seat belt is reduced. To achieve this object, at least either of a tip anchor or a tongue anchor is fixed or coupled to an upper rail of a slide mechanism, and much of impact load applied to the seat belt is dispersed over a vehicle body without passing through a height control mechanism disposed between the seat bottom frame and the upper rail.

DESCRIPTION OF THE PREFERRED EMBODIMENT

Figure 3:
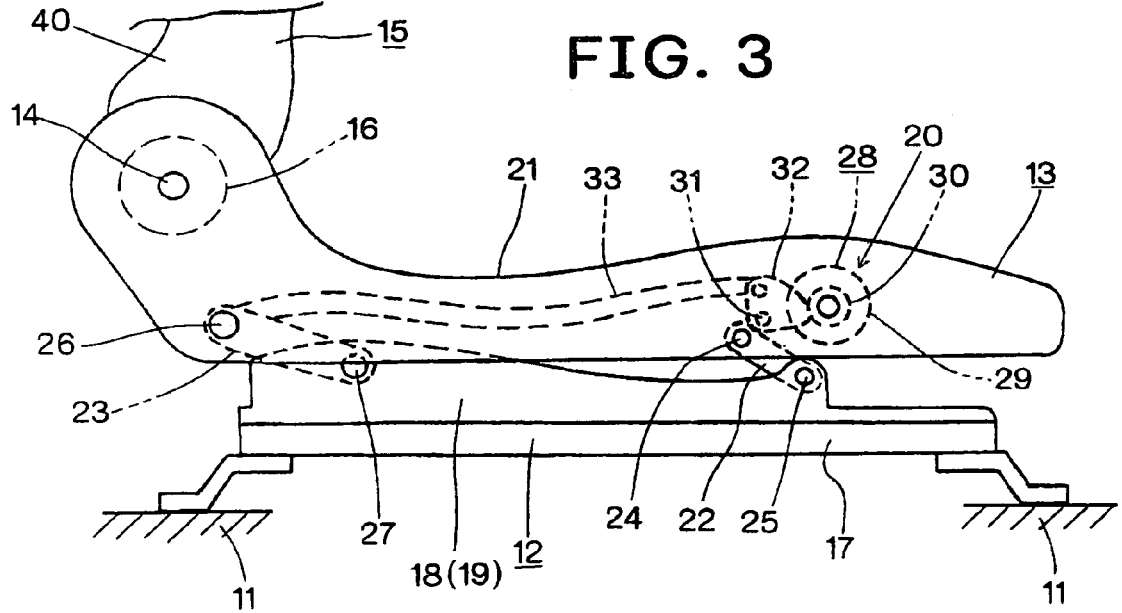
FIG. 3 is a side view showing a seat bottom frame, a slide mechanism and a height control mechanism.
Figure 4:
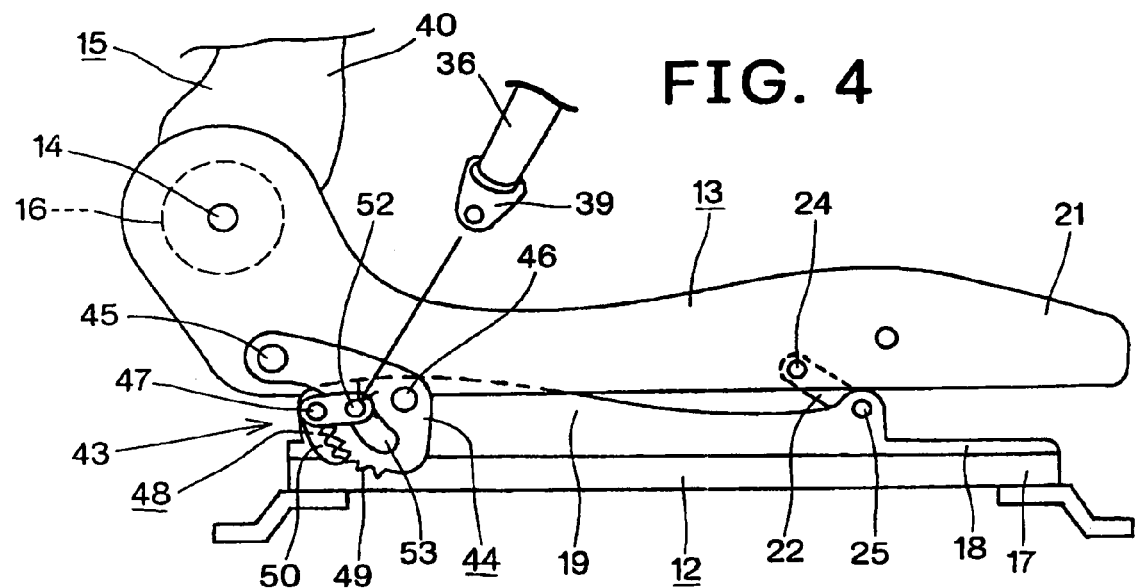
FIG. 4 is a side view showing the seat bottom frame, the slide mechanism and a height lock mechanism.

A vehicle seat 10 in accordance with an embodiment of the present invention has a seat bottom 13 slidably attached to a vehicle body (floor panel) 11 through a slide mechanism 12 and a seat back 15 rotatably attached to the seat bottom 13 by an axis 14. The seat back 15 is held at an arbitrary angle with respect to the seat bottom 13 by a reclining mechanism 16 (FIGS. 3 and 4).

The slide mechanism 12 has a pair of lower rails 17 fixed to the vehicle body 11 and upper rails 18 slidably engaged with the lower rails 17, respectively. An integral upright bracket 19 of each of the upper rails 18 is coupled to a seat bottom frame 21 through a height control mechanism 20.

The height control mechanism 20 has a pair of anterior rotating arms 22 and a pair of posterior rotating arms 23. An upper part of the anterior arm 22 is pivotally mounted on the seat bottom frame 21 by an anterior upper shaft 24 and a lower part of the anterior arm 22 is pivotally mounted on the upper rail 18 by an anterior lower shaft 25. An upper part of the posterior arm 23 is pivotally mounted on the seat bottom frame 21 by an posterior upper shaft 26 and a lower part of the posterior arm 23 is pivotally mounted on the upper rail 18 by a posterior lower shaft 27.

An operating part 28 of the height control mechanism 20 is provided at a desired position of the vehicle seat. The operating part 28 has an operating dial 29, a gear 30 rotated by the operating dial 29 and a sector gear 32 engaged with the gear 30. The sector gear rotates around a shaft 31. The sector gear 32 is coupled to an upper part of the posterior rotating arm 23 through a coupling means 33 such as a rod and a wire. When the driver or the passenger rotates the operating dial 29, the sector gear 32 rotates around the shaft 31, inclination angle of the posterior rotating arm 23 is changed and the seat bottom 13 is moved vertically. The configuration of the height control mechanism 20 is only an example and conventional various height control mechanisms can be used in the present invention.

Figure 1:
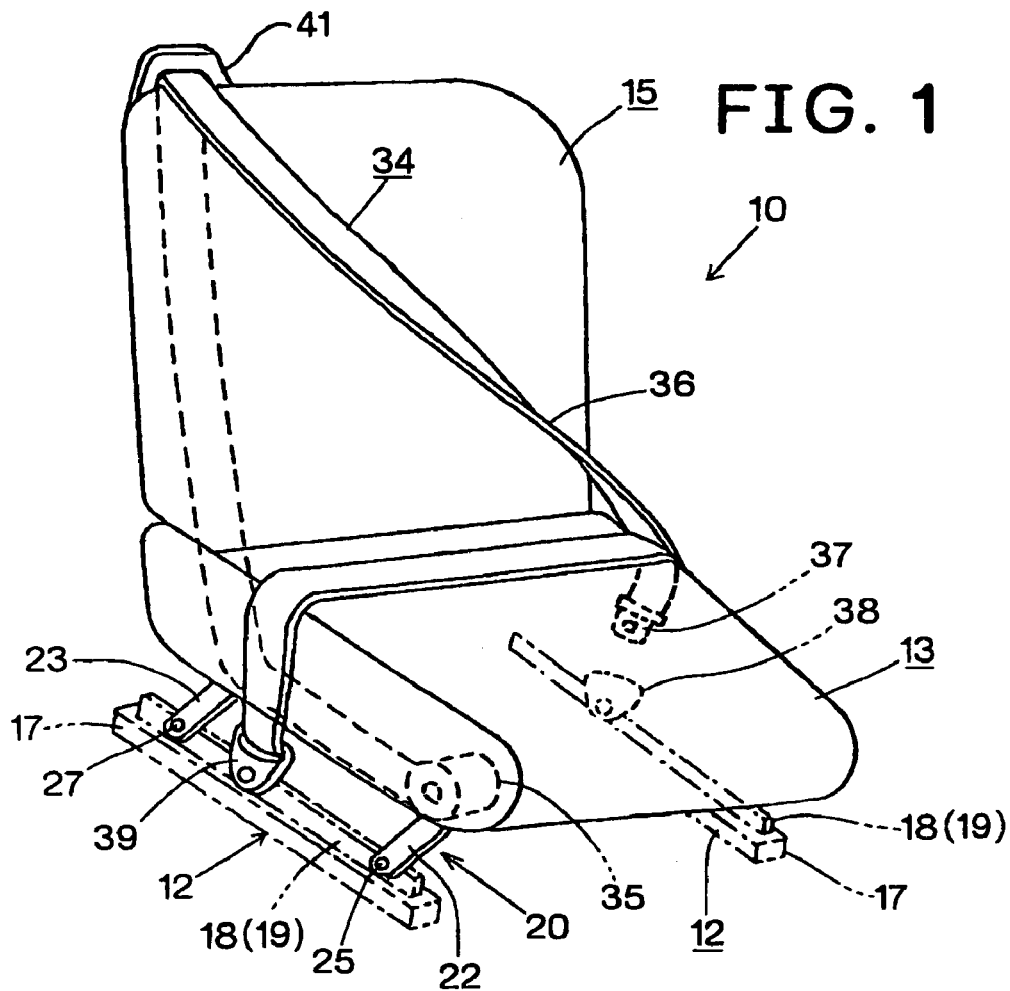
FIG. 1 is a perspective view of a vehicle seat with an integrated seat belt mechanism according to the present invention.
Figure 8:
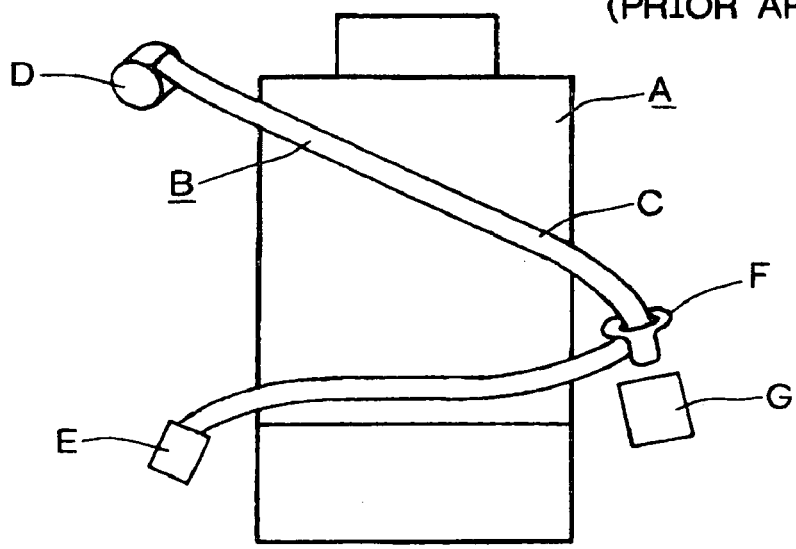
FIG. 8 is a schematic view showing the relationship between a conventional vehicle seat and a conventional individual seat belt mechanism.
Figure 2:
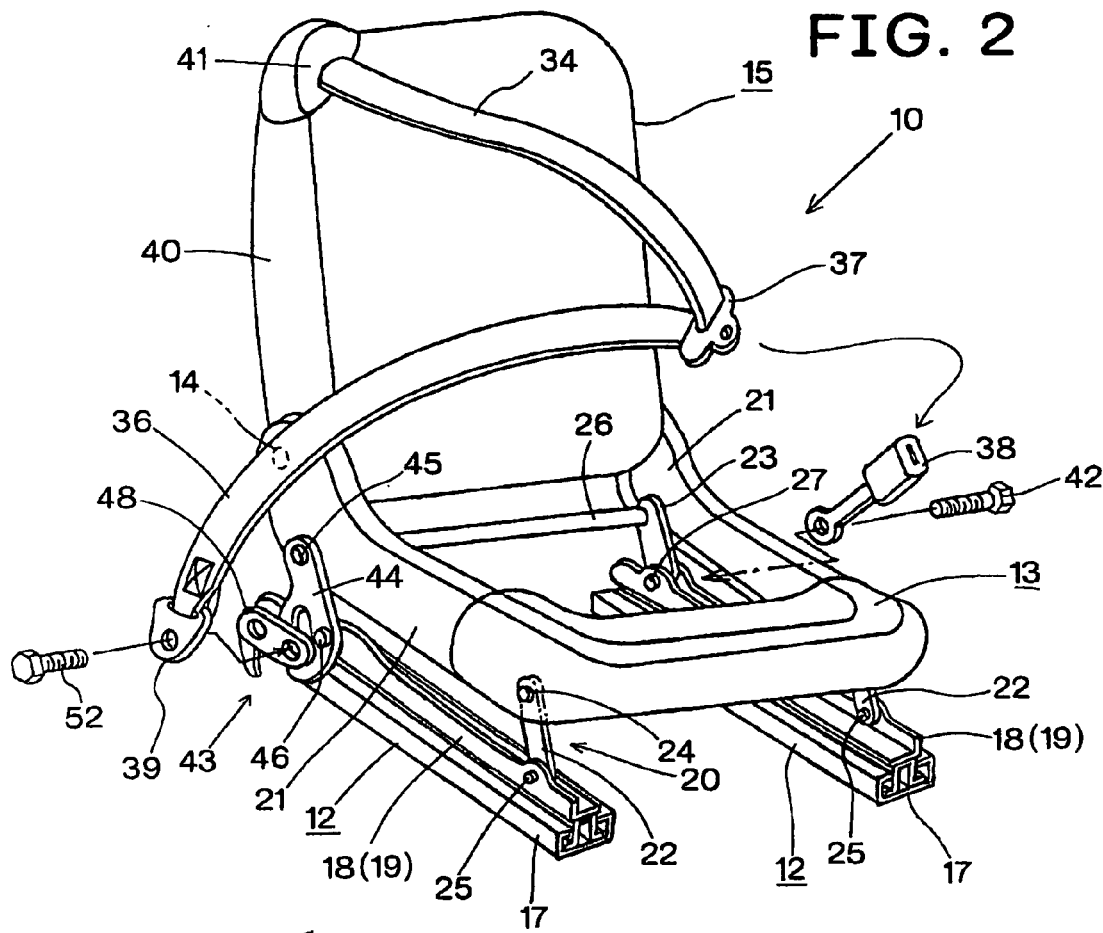
FIG. 2 is a view similar to FIG. 1 showing details of the integrated seat belt mechanism.

The vehicle seat 10 has an integral seat belt mechanism 34. The seat belt mechanism 34 has a belt retractor 35 (FIG. 1), a seat belt 36, a tongue plate 37 coupled to the midpoint of the seat belt 36, a tongue anchor 38 detachably engaged with the tongue plate 37 and a tip anchor 39. When a high load is applied to the seat belt 36 due to an accident or the like, the retractor 35 restricts extraction of the seat belt 36. The retractor 35 is fixed to a seat back frame 40 or to the seat bottom frame 21.

The seat belt 36 extending from the retractor 35 is extracted from a shoulder entrance 41 provided at an upper part of the seat back frame 40 of the seat back 15 to the outside of the vehicle seat 10. The shoulder entrance 41 is arranged at the seat back frame 40 on the side of a door. The tongue anchor 38 is fixed to the upper frame 18 with a bolt 42. A tip of the seat belt 36 is coupled to the tip anchor 39.

A height lock mechanism 43 for preventing the seat bottom frame 21 from moving upwards with respect to the upper rail 18 when impact load acts on the seat belt 36 is provided between the upper rail 18 and the seat bottom frame 21. The height lock mechanism 43 has a lock link 44 that connects the upper rail 18 to the seat bottom frame 21. An upper part of the lock link 44 is pivotally supported by an upper lock shaft 45, which is coaxial with the posterior upper shaft 26, to the bottom frame 21, and a lower part of the lock link 44 is pivotally supported by a lower lock shaft 46, which is coaxial with the posterior lower shaft 27, to the upper rail 18.

Figure 5:
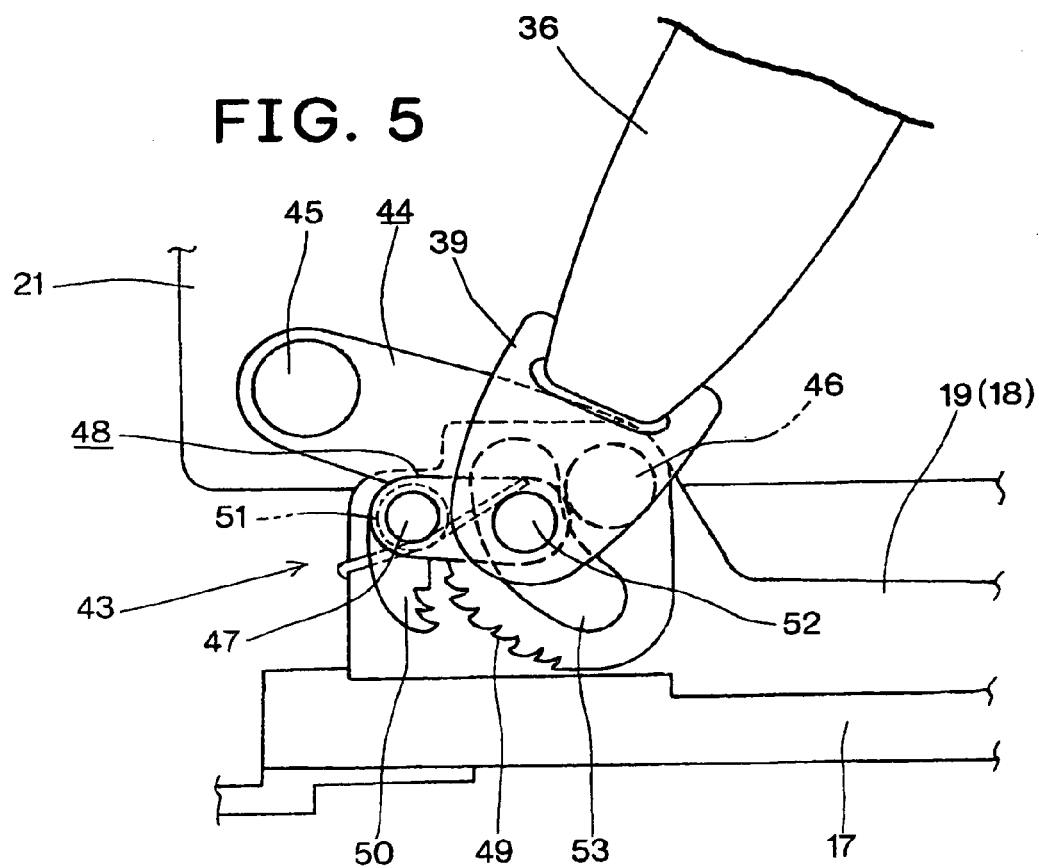
FIG. 5 is a side view showing the height lock mechanism in the state where a hook and a lock gear are not engaged with each other.
Figure 6:
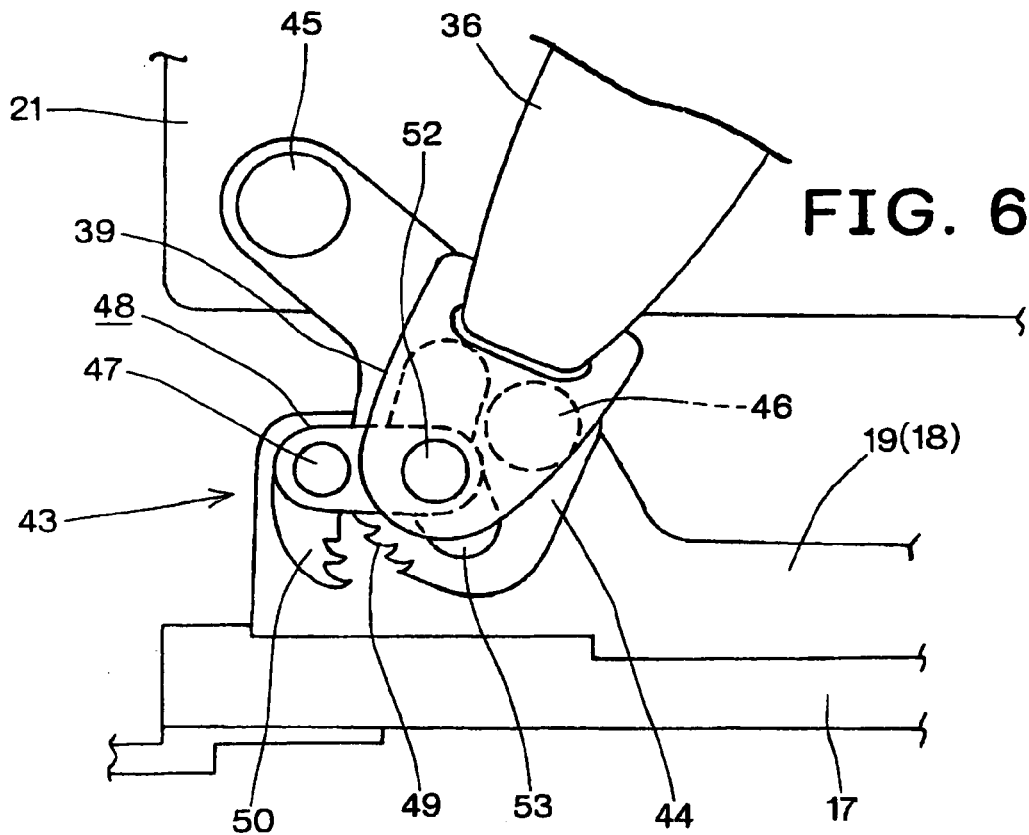
FIG. 6 is a side view showing the state where the seat bottom frame is moved upwards from the state shown in FIG. 5.
Figure 7:
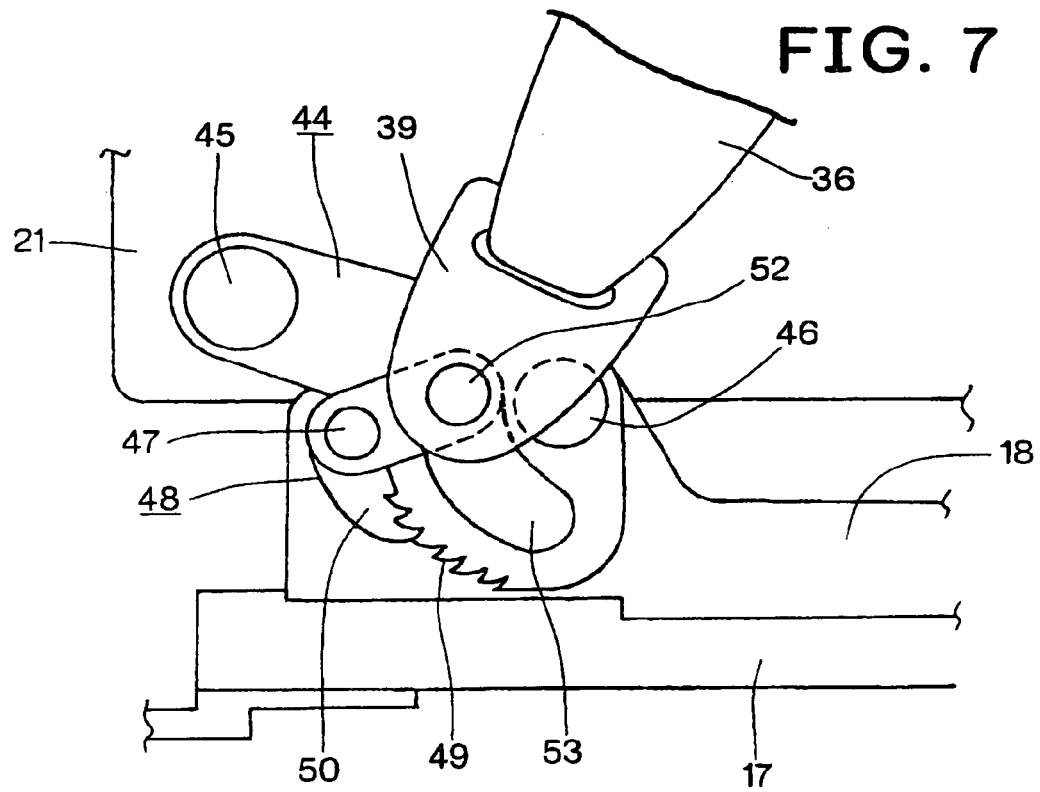
FIG. 7 is a side view showing the height lock mechanism in the state where the hook is engaged with the lock gear.

The height lock mechanism 43 has an L-shaped engaging arm 48 pivotally supported by a shaft 47 to the upper rail 18. A hook 50 capable of engaging with a lock gear 49 of the lock link 44 is formed at a tip of the engaging arm 48. The lock gear 49 has locking teeth formed in an arc having a lower lock shaft 46 as its center. The engaging arm 48 is urged by a cancel spring 51 in the clockwise direction in FIG. 5 and usually the hook 50 is not engaged with the lock gear 49.

The tip anchor 39 is pivotally supported by a connecting means 52 such as a screw to the engaging arm 48. The lock link 44 has a circular slot 53 that prevents interference with the screw 52.

When impact load is applied to the seat belt 36 due to an accident or the like, the tip anchor 39 is pulled upwards and the engaging arm 48 rotates in the counterclockwise direction against elastic force of the cancel spring 51, thereby the hook 50 engages with the locking teeth on the lock gear 49. As a result, clockwise rotation of the lock link 44 about the lower lock shaft 46 is restricted so that the seat bottom frame 21 is prevented from moving upwards with respect to the upper rail 18. At this time, the impact load applied to the tip anchor 39 is transmitted to the upper rail 18 through the anchor shaft 47 of the engaging arm 48. The impact load applied to the tongue plate 37 is transmitted to the upper rail 18 through the tongue anchor 38. For this reason, much of the impact load is transmitted to the vehicle body 11 without passing through the height control mechanism 20. Therefore, even if the retractor 35, the tongue anchor 38 and the tip anchor 39 of the seat belt mechanism 34 are attached to the vehicle seat 10, the upper force acting on the vehicle seat 10 due to the impact load can be reduced substantially, and the height lock mechanism 43 can be reduced in size and weight.

As noted above, when the hook 50 engages the locking teeth of the lock gear 49, rotation of the lock link 44 is restricted, thereby to prevent the vehicle seat 10 from moving upwards. In comparison, the lock link described in FR2796602A has a lock gear having an upper lock shaft as its center. In this configuration, when impact load acts on the vehicle seat, relative angle between the lock link and the seat bottom frame is maintained, but it is difficult to restrict rotation of the lock link having the lower lock shaft as its center.

Further, the lock gear 49 of the present invention is disposed under and behind the lower lock shaft 46 and the hook 50 is disposed behind the lock gear 49. Consequently, forward inertial force acting on the vehicle due to an accident or the like assists engagement of the hook 50 with the locking teeth of the lock gear 49. As a result, the engaging force between the hook 50 and the locking teeth of the lock gear 49 becomes more secure.

As described above, according to the present invention, it. is possible to attach the integral seat belt mechanism to the vehicle seat with the height control mechanism.

What is claimed is:

1. A vehicle seat with an integral seat belt mechanism comprising:
   a framework having a seat bottom frame and a seat back frame rotatably attached to the seat bottom frame;
   a slide mechanism having a lower rail fixed to a vehicle body and an upper rail slidably attached to the lower rail;
   a height control mechanism provided between the upper rail and the seat bottom frame;
   a seat belt;
   a belt retractor coupled to one end of the seat belt;
   a tip anchor coupled to second end of the seat belt;
   a tongue anchor detachably engaged with a tongue plate which is attached to a midpoint of the seat belt; and
   a height lock mechanism provided between the upper rail and the seat bottom frame;
   wherein said belt retractor is fixed to the framework;

wherein said tip anchor and said tongue anchor are attached to the upper rail; and wherein said height lock mechanism has a lock link pivotally mounted between the seat bottom frame and the upper rail, respectively and an engaging arm that is coupled to the tip anchor, and rotates to engage with the lock link when an impact load is applied to the seat belt, and said engaging arm is rotatably attached to the upper rail.

2. A vehicle seat with an integral seat belt mechanism according to claim 1, wherein an upper part of said lock link is rotatably attached to the seat bottom frame with an upper lock shaft, a lower part of the lock link is rotatably attached to the upper rail with a lower lock shaft and the lock link has a lock gear having locking teeth with which a hook on the engaging arm is engaged, said locking teeth being formed in an arc having the lower lock shaft as the center thereof.

3. A vehicle seat with an integral seat belt mechanism according to claim 2, wherein said lock gear is positioned under the lower lock shaft.

4. A vehicle seat with an integral seat belt mechanism according to claim 2, wherein said lock gear is positioned behind the lower lock shaft.

5. A vehicle seat with an integral seat belt mechanism according to claim 2, wherein said hook is positioned behind the lock gear.

* * * * *